Patented Nov. 9, 1948

2,453,625

UNITED STATES PATENT OFFICE 2,453,625

PROCESS OF PREPARING AND PACKING MENHADEN FOR MARKETING

George T. Harrison, Tilghman, Md.

No Drawing. Application May 18, 1944,
Serial No. 536,197

1 Claim. (Cl. 99—188)

My invention relates broadly to the preserving and packing of fish and more particularly to a process of preparing and packing menhaden for marketing as a food product.

One of the objects of my invention is to provide an improved method for preparing and packing menhaden for marketing as a food product.

Another object of my invention is to provide an improved process for preparing menhaden for canning and marketing as a food product.

Other and further objects of my invention reside in the preserving and marketing of menhaden as a food product eliminating the large waste of menhaden as a food which has heretofore existed.

My invention is directed to the process of preserving and packing menhaden for marketing as a nourishable food product. Heretofore menhaden, which is known by many names, such as mossbunker, bonyfish, poggy, budfish, yellowtail, skippaugs and others in the herring family, has been useful principally for bait in the catching of other fish or for conversion into oil and fertilizer. This is due in part to the large numbers of small bones in this type of fish and the tough scaly skin possessed by this type of fish. While the menhaden is found in countless numbers on the Atlantic side of the Americas from Nova Scotia to Brazil, the use of this fish as a food product has been very restricted.

By the process of my invention I have succeeded in preserving that portion of the menhaden which is nutritious as a food product and have succeeded in developing a process for preserving and packing this fish for general public consumption.

The fish as it is brought in fresh from the nets is subjected to the following series of method steps:

1. The heads are cut off, the fish are longitudinally split, the entrails removed and the blood scraped out.

2. The fish thus prepared are moved through a cutting machine containing a plurality of knives which cut the fish to size for the grinding machine.

3. The cut portions of fish are then subjected to a washing process in hot water at approximately 212° F. by passing the fish through a long washing machine containing hot boiling water. The bones of the fish are softened preparatory to subsequent substantial dissolution in the cooking process and the skin and scales are loosened, and while boiling hot the cut portions of fish are then abruptly changed in temperature by plunging the hot portions of fish into cold running water at a temperature of approximately 50° F. The cold water treatment is conducted in a rotary cylinder washing machine through which cold running water passes and into which the boiling hot portions of fish are dumped.

4. The rotary cylinder washing machine continues to operate at high speed in the cold running water subjecting the portions of fish to centrifugal action and continued agitation as a result of which the scales and skin fall away from the portions of fish leaving the fleshy portions of fish free of skin and scales. There is about four times as much oil in menhaden as in herring. The oil lies between the skin and the meat, and by removing the skin from the menhaden the oil is also removed, which is very objectionable to eat. This process performs three operations, it removes the skin, scales and oil, which has never been accomplished previously.

5. The fleshy portions of fish free of the skin and scales are then dumped on an endless conveyor constituting an inspection table.

6. The portions of fish thus delivered after the centrifugal treatment in cold water are inspected and those portions of fish which may have skin or scales still adhering thereto rejected for re-run operations or the particles of skin and scale manually removed therefrom.

7. The cleaned fleshy portions of fish are then delivered to an elevating apparatus through which these portions of fish are elevated and dumped into a grinding machine.

8. The fleshy portions of fish are then ground to small particles.

9. The ground particles of fish are dumped into the hopper of an automatic filler for containers or cans.

10. The containers or cans containing the ground particles of fish are then moved through an exhaustion chamber for evacuation and after evacuation are moved into a closing and sealing chamber where the containers or cans are automatically closed and sealed in vacuum.

11. The closed and sealed evacuated cans or containers are then processed by cooking. In this cooking process the bones are substantially dissolved.

12. The cooking operation results in the production of a solid mass of nutritious fleshy menhaden which is the final product produced by the method of my invention.

The dominating step in the process of my invention is the treatment of the particles of fish under conditions of abrupt change in temperature. A temperature drop of approximately 162 degrees is effected suddenly which tends to loosen the tough skin and scale from the fleshy portion of the fish so that by agitation the undesired tough skin, scales and oil may be removed, leaving the desired fleshy portions of the fish for packaging and consumption.

The food product produced has very fine appearance and is in the nature of a loaf which may be readily sliced and made into fish cakes or salads. Menhaden is rich in vitamins and food value and is tasty and nutritious.

While I have described the process of my invention in its preferred embodiment I realize that modifications may be made and I intend no limitations upon my invention other than may be imposed by the scope of the appended claim.

What I claim and desire to secure by Letters Patent of the United States is as follows:

The method of preparing and packing menhaden for marketing which comprises washing cut portions of menhaden in hot water at approximately 212° F. and raising the temperature of said cut portions of menhaden to approximately 212° F., violently cooling the cut portions of menhaden through a temperature of approximately 162° F., centrifugally acting upon the cut portions of menhaden while maintaining the temperature thereof at approximately 50° F. for freeing the fleshy portions of the menhaden from the skin, scales and oil, grinding the fleshy portions of the menhaden to small particles, filling containers with the small particles of menhaden substantially free of skin, scales and oil, and cooking the small particles of menhaden in the containers for producing a solid mass of fleshy menhaden substantially free of skin, scales and oil.

GEORGE T. HARRISON.

REFERENCES CITED

The following references are of record in the file of this patent:

UNITED STATES PATENTS

| Number | Name | Date |
|---|---|---|
| 127,115 | Stanley | May 21, 1872 |
| 2,104,027 | Dubus | Jan. 4, 1938 |
| 2,155,308 | Harris | Apr. 18, 1939 |
| 2,199,088 | Fauth | Apr. 30, 1940 |
| 2,236,113 | Quamma | Mar. 25, 1941 |
| 2,411,188 | Borg | Nov. 19, 1946 |